(12) United States Patent
Methner et al.

(10) Patent No.: US 10,287,537 B2
(45) Date of Patent: May 14, 2019

(54) CLARIFICATION METHOD

(71) Applicant: TECHNISCHE UNIVERSITÄT BERLIN, Berlin (DE)

(72) Inventors: Frank-Jürgen Methner, Bitburg (DE);
Thomas Kunz, Berlin (DE);
Hans-Ulrich Endreß, Neuenbürg (DE);
Thomas Kurz, Pforzheim (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 357 days.

(21) Appl. No.: 14/430,823

(22) PCT Filed: Sep. 24, 2013

(86) PCT No.: PCT/EP2013/002863
§ 371 (c)(1),
(2) Date: Mar. 24, 2015

(87) PCT Pub. No.: WO2014/048558
PCT Pub. Date: Apr. 3, 2014

(65) Prior Publication Data
US 2015/0307824 A1  Oct. 29, 2015

(30) Foreign Application Priority Data
Sep. 25, 2012 (DE) .......................... 10 2012 019 314

(51) Int. Cl.
*C12H 1/056* (2006.01)
*A23L 2/72* (2006.01)
*A23L 2/82* (2006.01)
*C12C 11/11* (2019.01)

(52) U.S. Cl.
CPC .............. *C12H 1/0424* (2013.01); *A23L 2/72* (2013.01); *A23L 2/82* (2013.01); *C12C 11/11* (2013.01)

(58) Field of Classification Search
CPC .... A23L 2/70; A23L 2/80; C12G 1/02; C12C 5/00; C12H 1/10; C12H 1/0424

USPC ................................ 426/590, 592, 422, 573
See application file for complete search history.

(56) References Cited

U.S. PATENT DOCUMENTS 7,160,563 B1  1/2007  Malcorps et al.
2009/0169691 A1 *  7/2009  Duan .................... C12H 1/0424
                                                                  426/330.4

FOREIGN PATENT DOCUMENTS

| AU | 2008258267 A1 | * | 12/2008 |
| DE | 3614656 C1 | | 6/1987 |
| GB | 555089 A | * | 8/1943 |
| GB | 2314564 A | * | 1/1998 |
| WO | WO 98/00519 A1 | | 1/1998 |
| WO | WO 2006/032088 A2 | | 3/2006 |

OTHER PUBLICATIONS

International Search Report, issued in PCT/EP2013/002863, dated Apr. 1, 2014.
Roger A. Mussche et al., "Total Stabilisation of Beer in a Single Operation", Journal of the Institute of Brewing, vol. 105, No. 6, May 16, 1999, XP055095986, pp. 386-391.

* cited by examiner

*Primary Examiner* — Vera Stulii
(74) *Attorney, Agent, or Firm* — Birch, Stewart, Kolasch & Birch, LLP

(57) ABSTRACT

In a clarification method for a beverage liquid, in particular for producing beer, the beverage liquid, after it passes through a fermentation stage, is subjected to a clarification which serves for removing active haze components from the beverage liquid, and fed to a maturation vessel in which the beverage liquid is stored for a maturation time. In a further method step, the beverage liquid is charged with at least one pectin-containing clarification agent for increasing a filtration performance. In this case it is provided that the pectin-containing clarification agent is introduced into the beverage liquid on the path from the fermentation stage to the maturation vessel and the pectin present therein, before the feed to the maturation vessel, is at least for the most part removed again from the beverage liquid.

18 Claims, 5 Drawing Sheets

CLARIFICATION METHOD

TECHNICAL BACKGROUND

The invention relates to a clarification method for a beverage liquid, in particular for the production of beer, wine or juices, by applying or using a fast-acting/complexing pectin. In the method the beverage liquid is subjected to clarification after passing through a fermentation stage, said clarification being used to remove haze components from the beverage liquid. In this case the beverage liquid is charged with at least one pectin-containing clarifying agent to increase the subsequent filtration effect. Furthermore, the beverage liquid is supplied to a maturation or storage tank, in which the beverage liquid is stored for a maturation period. Depending on the existing drinks matrix (beer, wine, juices or comparable drinks), particularly with regard to the degree of esterification and amidation, the most suitable pectins to be used as fast-acting/complexing pectins are those which are referred to as Pectino-floc A, B, C etc.

In addition to aroma, taste and colour, the most important qualities of clear drinks (e.g. beer, wine, juices, etc.) include clarity and chemical-physical shelf-life, also referred to as colloidal stability. In order to obtain crystal clear beers, wines or juices, the latter have to be filtered. It is possible to use clarifying agents to increase the filtration effect and shorten the production time of drinks such as beer, wine, fruit juices etc.

The filtered, clear beers, wines and other drinks lose their brightness after a period of time, and after a corresponding storage period an undesirable formation of haze may be observed. Due to the formation of haze the quality of the drinks is generally worsened and the shelf life is reduced. There are many possible reasons for the formation of haze and in principle a distinction is made between biological and non-biological stability. In the case of non-biological stability, which is also referred to as colloidal or chemical-physical stability, chemical and physical reactions are considered to be responsible for the formation of haze, whereas the influence of beer-damaging microorganisms is considered to be the reason in the case of biological stability. Furthermore, non-biological haze is subdivided into cold haze, also known as reversible haze, and permanent haze, which is referred to as irreversible haze.

Cold haze is formed at temperatures between $-2°$ C. and $+5°$ C. and dissolves without residue on heating.

In contrast beers or drinks containing irreversible haze do not clear even at room temperature. Cold haze is considered to be the precursor of irreversible haze and is therefore of particular interest, as by reducing cold haze the formation of irreversible haze is also reduced or prevented.

With regard to the chemical-physical formation of haze in beer and other drinks the interaction between haze-active polyphenols and proteins has been recognised as particularly influential. Therefore, in the drinks industry stabilising agents such as PVPP (polyvinylpolypyrrolidone), bentonite and silica gel are used to remove the haze-active polyphenols or proteins in the production process. More recent research has also shown that specific metal ions are particularly involved in the formation of reversible cold haze. In this case in particular reference is made to the complex formation of metal ions of a specific oxidation stage which are dependent on the temperature and pH with the present polyphenol-protein compounds.

In the pH range of beer (pH 4.2-4.4) in particular oxidised metal ions such as $Fe^{3+}/Cu^{+}$ are formed after using up the endogenous antioxidant potential by oxidative processes involving the Fenton-Haber-Weiss reaction system and, with the existing polyphenol-protein compounds, produce visible, temperature and pH-dependent complex compounds.

In addition to the clarifying effect of pectic acid described in DE 3614656 C1, which has also occasionally been used in the past for fining wine, WO 2006/032088 A2 describes the use of pectin as a stabiliser in the brewing process. In this connection, in addition to the clarifying effect of pectin the stabilising effect on the colloidal shelf life of beers is highlighted in particular. To explain the stabilising effect and the corresponding increase in the colloidal shelf life different possible mechanisms have been proposed and described with the formation of networks between pectin and $Ca^{2+}$, $Mg^{2+}$ ions. The haze-active polyphenols, proteins and carbohydrates are meant to embed themselves into the formed networks and are removed by sedimentation or at the latest during filtration.

According to WO 2006/032088 A2 the pectin used causes a significant colloidal stabilisation effect when added in an aqueous solution of sodium citrate, citric acid and potassium metabisulfite to unfiltered beer during maturation.

In contrast to PVPP and silica gel however, research has not shown a significant stabilisation effect on the colloidal beer stability caused directly by the pectin. This is the case in particular if the pectin is simply added to the unfiltrate dissolved in an aqueous solution or buffering solution (i.e. without sodium citrate, citric acid and potassium metabisulfite) according to the teaching of WO 2006/032088 A2 during maturation. Rather all of the results indicate that the delayed formation of haze described in said prior art and the associated higher colloidal beer stability are not caused by the pectin as such, but are the result of the indirect addition of SO2 and citric acid by means of the predetermined pectin solution with the use of potassium metabisulfite or sodium citrate/citric acid.

In Germany the direct addition of sulphur dioxide to beers brewed according to the German purity law is not permissible. Sulphur dioxide is an important antioxidant in beer and other drinks and may be added to increase the oxidative beer (drink) stability. The formation of haze in beers relative to the storage period is directly associated with oxidative processes and the oxidative beer stability. The connection between oxidative and colloidal beer stability has long been known and was recently verified by relevant research considering the endogenous antioxidative potential of beers (drinks). On the basis of the described connections, the colloidal beer stabilisation described in the prior art is not a result of the added pectin but is achieved by the addition of SO2 and citric acid. In this way the contents of beer involved in the formation of haze (e.g. metal ions) can be complexed (e.g. citric acid) and the formation of haze caused by oxidation can be delayed (mainly addition of SO2).

In contrast to the negative evidence as a stabilising agent, the clarifying effect of the pectin in the production process was clearly evident regardless of the SO2 content in all of the research work. In corresponding laboratory trials it was possible with different types of pectin to achieve a good clarification effect during beer maturation and to reduce the filtration times or significantly increase the filtration effect.

FIG. 1 shows a filtration line V1 after clarification using 80 ppm pectin B and a control line K in the absence of pectin. The lines show respectively the mass G in grams of the held-back material over time t in seconds. The filtration is performed at 0.5 bar, $0°$ C. and 0.45 pm.

In larger scale production however, unlike the conditions described in the prior art, there were huge difficulties related to handling. The sedimentation of a pectin flake described in the prior art could not be achieved because of the flow conditions during beer maturation or could only be achieved rarely in application. This is mainly because of the flow conditions and the very light pectin agglomerates (pectin flakes) which are held in suspension by the slightest vibration or flows. On this basis it is difficult to draw off a more clarified beer in the upper maturation tank area for accelerated filtration and to perform filtering without corresponding losses of beer.

Additional filtration trials have shown that the pectin agglomerates held in suspension are only suitable to a limited degree or are not at all suitable for accelerating the filtration after maturation. This is probably due to the fact that the network formed by the pectin in the described procedure over time in the maturation or storage tank goes back into the solution or breaks up and the partially dissolved pectin reduces the filtration effect.

The procedure described in the prior art is also only suitable to a limited extent for handling pectin easily and above all using it economically as a clarifying agent in beer production, i.e. pectin is not suitable as a stabilising agent and in the given procedure is only suitable to a limited degree as a clarifying agent in the brewing process.

Furthermore, for a number of years gallotannins have been used in the brewing industry for colloidal stabilisation and for avoiding the gushing effects in drinks (gushing: excessive spontaneous foaming of drinks after opening a bottle). The functional principle is based on the fact that the gallotannins bind to the existing haze-active or active gushing protein fractions and then the precipitations formed can be separated (e.g. filtration). When using gallotannins to reduce the gushing potential of drinks use is additionally made of the fact that active gushing and prooxidatively-acting metal ions, in particular Fe, are present in complexed form in the gallotannin-protein compounds formed and can be removed by the formed precipitations.

OBJECT/INVENTION

Against this background, the object of the invention was to improve the use of pectin as a stabilising agent in the brewing process and in particular to optimise the mechanism of flocculation and the influences on clarification.

Said object is achieved by a clarification method having the features of claim 1. In this case the pectin-containing clarifying agent is added to the beverage liquid on route from the fermentation stage to the maturation vessel, i.e. either, particularly at the end of the fermentation process, to a fermentation or intermediate tank of the fermentation stage or to a connecting line between the fermentation tank and the maturation vessel. In each case the pectin contained in the added pectin-containing clarifying agent prior to adding to the maturation vessel is removed from the beverage liquid at least for the most part, that is in a proportion of over 50% of the previously introduced amount, preferably in a proportion of at least 70% and ideally in a proportion of over 90% of the previously introduced amount. This results in a number of new possibilities for using specific pectins as clarifying agents during the production of drinks and in particular in the brewing process, optimising their use and making their use at all possible in specific processing steps and plants. It is possible by adding a specifically metered amount of pectin with a very short contact time to achieve a sufficient clarification of the beverage liquid and to increase the filtration effect significantly. In this way the rapid clarification effect of the pectin is used to form pectin flakes formed by charging on the route of the beverage liquid from the fermentation stage to the maturation vessel and to remove them again.

In a particularly advantageous embodiment, in a further method step a preliminary clarification of the beverage liquid is performed between charging the beverage liquid with the pectin-containing clarifying agent and feeding it to the maturation vessel. In this way for example a device can be used at the same time for separating yeasts prior to the beer maturation to remove the pectin flakes.

It is favourable in this case if the preliminary clarification is performed by means of a separator for separating yeasts prior to beer maturation, whereby the pectin-containing clarifying agent added to the beverage liquid or the resulting pectin flakes can be removed almost completely from the beverage liquid.

Advantageously, there is a contact period between the pectin-containing clarifying means and the beverage liquid between the step of charging the beverage liquid with the pectin-containing clarifying agent and the preliminary clarification, in which the pectin-containing clarifying agent or the resulting pectin flakes are removed again from the beverage liquid, which contact period for example even with the addition of the pectin-containing clarifying agent to the fermentation tank or an intermediate tank of the fermentation stage is less than 24 hours. However, depending on the plant the contact period can also be less than 1 hour and more preferably less than 10 min, for example if the pectin-containing clarifying agent is only added after the fermentation stage to a connecting line between the fermentation stage and maturation vessel into the drinks fluid. By means of these short and different contact periods the clarification method can be implemented in a particularly large number of plants and can be adapted individually to every plant.

In addition it is favourable if the beverage liquid is filtered in a further method step following the storage of the beverage liquid in the maturation vessel. In this way the clarification can be improved further in that the preliminary clarification preceding the maturation stage with the addition of pectin results in a much improved filtration effect after maturation.

Advantageously, during the filtration the relevant beverage liquid is removed from an upper third of the maturation vessel or from an upper third of the filled maturation vessel volume and is supplied to a membrane/diatomaceous earth filter, whereby a particularly high degree of clarification of the filtered beverage liquid can be ensured.

Furthermore, it is favourable if the pectin-containing clarifying agent contains an amount of pectin, which is 1 to 200 ppm, preferably 20 to 100 ppm and in particular 30 to 80 ppm relative to the amount of beverage liquid to be charged. In this way, at relatively little cost for the pectin used as clarifying agent a sufficiently high degree of clarification is possible.

In a further advantageous embodiment, the pectin-containing clarifying agent is formed by an aqueous solution, whereby a rapid and relatively even distribution of the pectin can be ensured on charging the beverage liquid.

In this case it is favourable if the aqueous solution contains at least one buffering agent.

In a further advantageous embodiment, the pectin-containing clarifying agent contains a pectin taken from the group of Pectino-floc/A, B, C, whereby in particular a particularly good clarification can be achieved in a beer brewing process.

In a particularly advantageous embodiment, the beverage liquid is charged with gallotannins in an additional method step. In this way the clarification effect achieved by the pectin-containing clarifying agent can also be increased significantly even in poorly clarifying drinks matrices or beer matrices. By using gallotannins, gallotannin-protein compounds are formed which have a larger particle size in the drinks/beer matrix than the protein fractions alone. In this way the clarification can be extended by means of pectin-containing clarifying agents to a particularly large number of applications or the clarification effect of the clarification method according to the invention can be increased further. In addition the later filtration effect is improved in this way.

In this case, it is particularly favourable if the charging of the beverage liquid with gallotannins is performed prior to charging the beverage liquid with the pectin-containing clarifying agent. In this way the larger particles of the gallotannin-protein compounds which embed better can also be formed prior to the development of the pectin network.

In this case, it is advantageous if the charging of the beverage liquid with gallotannins is performed at least one minute prior to charging with the pectin-containing clarifying agent. In this way the gallotannin-protein compounds can be embedded particularly well into the pectin network formed by the subsequent addition of the pectin-containing clarifying agent.

Furthermore, it is favourable if in a method step preceding the charging of the beverage liquid with the pectin-containing clarifying agent an accelerated process is performed for determining a pectin that is most suitable for the respective beverage liquid to be charged from a group of several possible pectins for the production of the pectin-containing clarifying agent. In this way within a short period for a respective drinks matrix the pectin can be determined from a group of several given pectins which can be used to achieve the best clarification result.

Advantageously, in the accelerated process each of the possible pectins is added in a predetermined amount to the existing beverage liquid to be charged and is centrifuged with the latter, and in a subsequent method step a respective haze measurement of the beverage liquid is performed by setting a suitable temperature range for the relevant production step. In this way the most suitable pectin can be determined particularly rapidly and reliably.

DESCRIPTION OF AN EMBODIMENT OF THE INVENTION

Further research has shown that the addition of pectin in an aqueous solution or buffering solution during fermentation or preferably before the completion of fermentation (within the last 24 h) is a possible alternative in the process or use as a clarifying agent.

At the end of the fermentation, at the "hosing" stage a centrifuge is used in many breweries to separate yeasts prior to beer maturation. This processing step can be used at the same time to separate off a large proportion of the pectin flakes that have formed and to achieve a respective preliminary clarification of the beer. By means of the preliminary clarification after maturation a significant increase in the filtration effect can be achieved. In corresponding series of tests (test brews) after maturation a 25-40% improvement in the filtration effect (membrane/diatomaceous earth filtration) was shown in beers clarified by pectins (FIG. 2, 3).

FIG. 2 shows the effect of the new alternative addition of pectin solution B on the haze (in EBC H90) T and clarification at the end of fermentation and subsequent centrifugation (separator) in different concentrations at 12° C., an amount of 3000 g and a centrifugation time of one minute.

FIG. 3 shows the increase in the filtration effect on surface filtration by means of a 0.45 μm membrane filter at 0° C., 0.5 bar and an amount of 100 ml on the basis of the new procedure on adding pectin solution B at the end of fermentation and subsequent centrifugation (separator). The lines V40, V60, V80 and VK show respectively the mass G in grams of the retained material over time t in seconds in a concentration of the pectin solution of 40 ppm, 60 ppm, 80 ppm or in a control filtration without using a pectin solution.

FIG. 4 shows a system for performing the clarification method according to the invention.

FIG. 4 shows by way of example a section 2 of a brewery or drinks production plant. The latter comprises a fermentation tank 4, which is connected via a connecting line 6 to a separator 8 and to a maturation tank 10. Between the fermentation tank 4 and the separator 8 there is also a metering device 12, by means of which a pectin-containing clarifying agent can be delivered to the connecting line, which charges the beverage liquid transported therein. Furthermore, between the fermentation tank 4 and the metering device 12 a further metering device 14 can be provided, by means of which the beverage liquid can be charged additionally with gallotannins prior to charging with the pectin-containing clarifying agent.

The clarifying activity of the pectin is based essentially on its interaction with Ca2+ ions in the drinks. Pectin forms a network with Ca2+ ions which binds haze particles such as protein-polyphenol complexes and yeast cells.

The effectiveness of the clarification has proven to be dependent on the degree of esterification or amidation, the concentration of pectin and the ratio of free Ca2+ ions (Mg2+-plays a subordinate role) to the added amount of pectin.

Accordingly and by means of additional factors, such as the pH, temperature range etc. the formation of pectin flakes and the clarification effect in different drinks or different beers is influenced variably by the existing matrix. Excessively high concentrations of Ca2+-ions result in the gelling of the pectin and the clarification effect does not take place.

In order to achieve the best possible clarification during the production of drinks the type of pectin (i.e. in the range of specific degrees of esterification or amidation) needs to be selected specifically for example (Pectino-floc/A, B, C, etc.) and adjusted to the amount of pectin added to the drinks matrix (beer matrix).

For this purpose an analytical accelerated process has been developed and applied, by means of which it is possible within a very short time to determine the optimal pectin for the given drinks matrix. The advantage of the analytical accelerated process over sedimentation tests is the direct practical relevance, the short time required and the avoidance of long recalculation functions to describe the behaviour in the drinks matrix more precisely (cf. FIG. 5, 6, 7). For specific ranges there are the most suitable pectins (Pectino-floc/A, B, C) which can be used for many drinks or beers at the same time.

Figure 7:
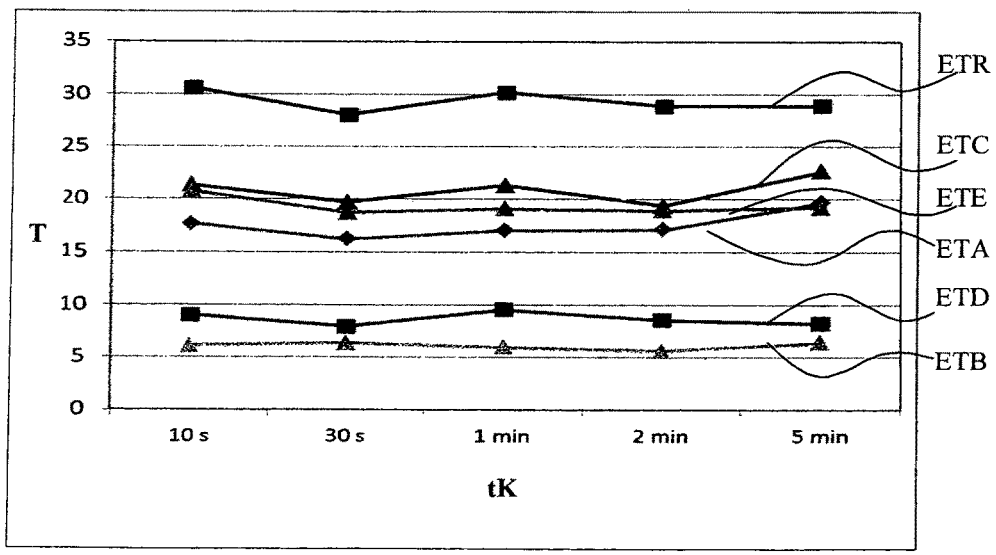

FIG. 7 shows the results of the new pectin suitability test for determining or defining the most suitable pectin for a given drinks/beer matrix for a typical example of use of the accelerated test in a predefined drinks matrix. The lines ETA, ETB, ETC, ETD, ETE and ETR show the haze T in EBC (90° C.) over the pectin contact time tK for the pectins A (Z), B (A), C (A), D (A) and a reference suitability test, which is performed without the addition of a pectin.

Further research findings relating to the reaction kinetics of specific pectins make it possible to optimise the use of pectins as clarifying agents in drinks further at little cost. On the basis of the present results and findings, it is possible with the addition of a specific amount of pectin in the brewing process or in the production of drinks, with a very short contact period of less than an hour, preferably also less than a minute and even below a contact period of 30 seconds, 20 seconds or 10 seconds, to achieve sufficient clarification and to increase the filtration effect significantly. From this finding a number of new possibilities have emerged for using specific pectins as clarifying agents in the production of drinks and in particular in the brewing process, for optimising the use thereof and only making this possible in specific processing steps.

Figure 1:
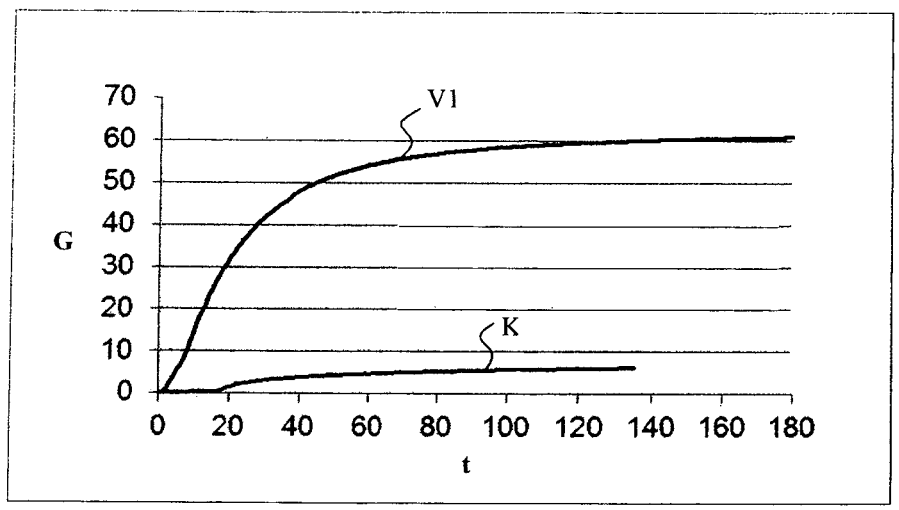
Figure 2:
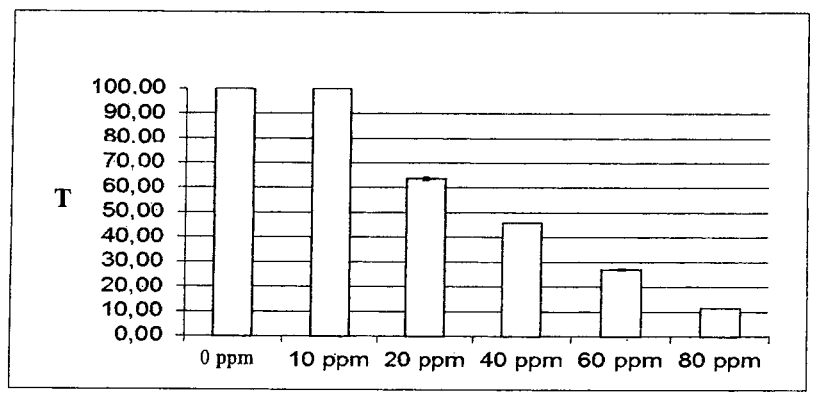
Figure 3:
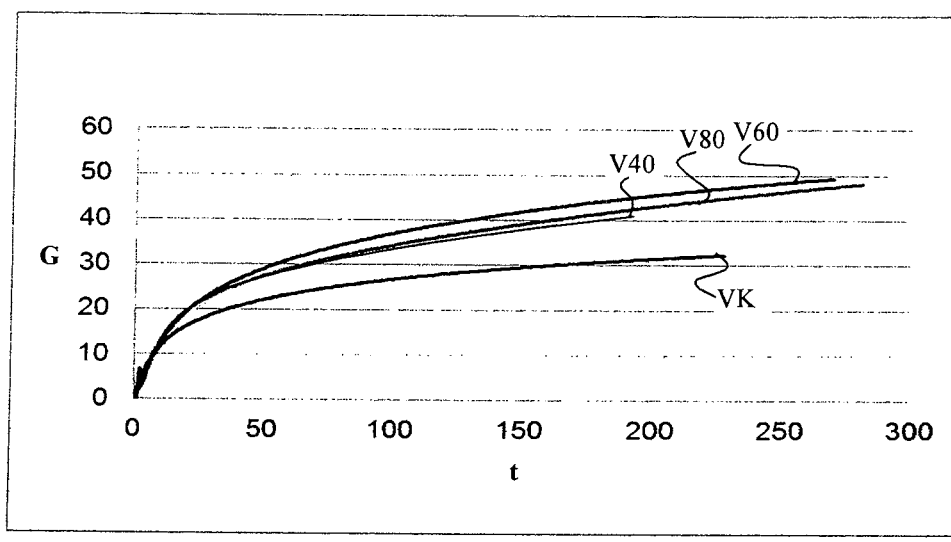
Figure 4:
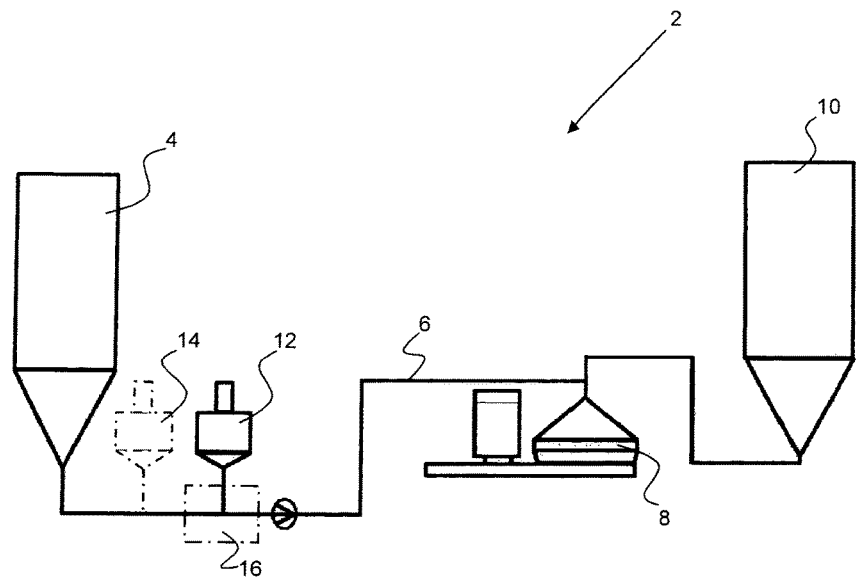
Figure 5:
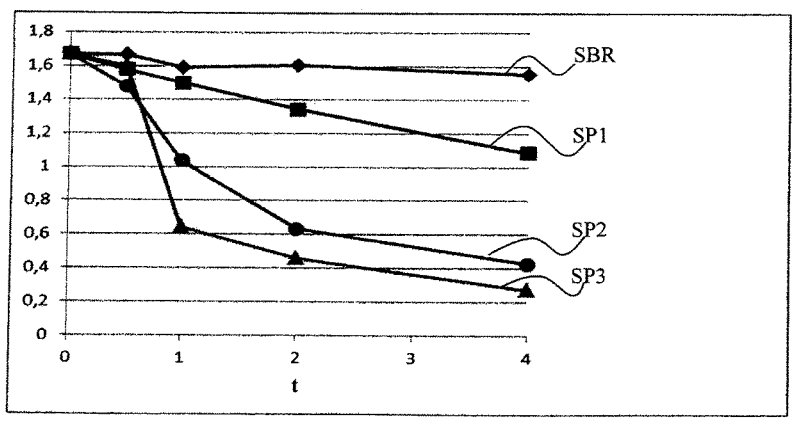
FIG. 5 shows the results of sedimentation tests S using different esterified/amidated pectins P1, P2, P3 and an unfiltered reference beer BR over time t in hours.
Figure 6:
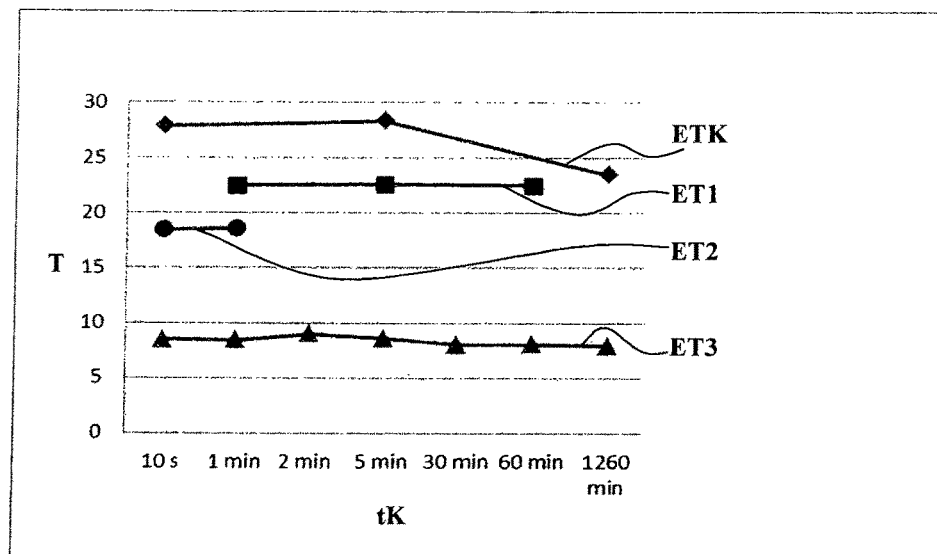
FIG. 6 shows the results of the new pectin suitability test for determining or defining the most suitable pectin for the given drinks/beer matrix. The lines ET1, ET2, ET3 and ETK show the haze T in EBC (90°) over the pectin contact time tK for the pectins AU 701 (VE:38), CU-L (DE:32/DA:18), AU-L (DE:30/DA:19) and a control suitability test, which is performed without the addition of a pectin.

In the special example shown in FIG. 4 during the brewing process the pectin most suitable for the beer matrix (Pectino-floc/A,B,C, etc.) is added at the end of the fermentation (e.g. fermentation tank) or injected into the feed line in a special application on the route of the beer from the fermentation tank 4 to the separator 8 and the rapid clarification effect is used to remove the pectin flakes that have formed directly after the separator 8. In this case, as shown by a dot-dash line, an intermediate tank 16 can be provided on the connecting line 6, in which a partial separation of pectin flakes can be performed additionally ahead of the separator 8. Depending on the flow conditions the pectin-containing clarifying agent can be injected ahead of the intermediate tank 16 into the connecting line 6 or, as shown, into the intermediate tank 16 itself.

In each case the preliminary clarification results in a significant improvement of the filtration effect at very little cost or a reduction of the filtration costs. The pectins remaining after the separator reach the maturation tank 10 and are removed at the latest by filtration.

In the final product galacturonic acid could not be detected (IC), which indicates that the pectin is completely removed at the latest by filtration.

Further investigations have shown that the described clarification effect of the pectins can be increased by using them in combination with gallotannins even in a drinks matrix or beer matrix that is difficult to clarify. In practice the combined use of pectin and gallotannins is beneficial as soon as the clarifying effect using pectin alone is no longer sufficiently effective or the filtration effect needs to be improved further.

By means of this innovative approach it is also possible to improve the colloidal and oxidative stability of the produced drinks significantly. Furthermore, in this way any possible gushing potential (sudden excessive foaming) can be reduced. This is achieved in that the gallotannins used bind themselves to haze-active or active gushing protein compounds. The cloudy particles produced in an appropriate drinks matrix are suitable or more suitable for embedding into the network formed by the pectin.

As a result the clarification can be improved significantly in this way in an appropriate drinks matrix. Furthermore, by means of optimised clarification also the metal ions (in particular iron and copper ions) incorporated into corresponding complex compounds with a prooxidative and gushing active effect are removed from the drinks matrix. As a result greater oxidative drinks stability is achieved and the gushing potential reduced.

In order to optimise the clarification of drinks or beer matrices by means of the combined use of pectin/gallotannin, the present invention makes use of the fact that the gallotannin-protein compounds formed by the gallotannins introduced via the second metering device 14 into the beverage liquid have a larger particle size in the drinks/beer matrix than the protein fraction alone and are incorporated particularly well into the pectin network formed by the use of pectin.

Figure 8:
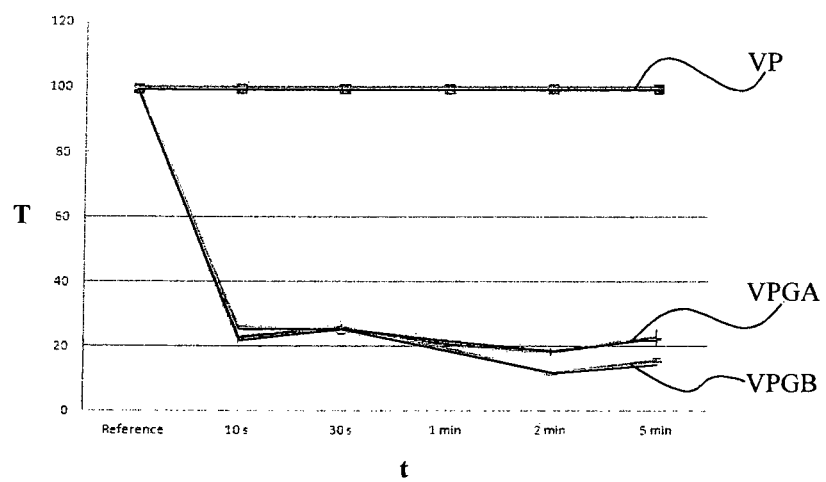
Figure 9:
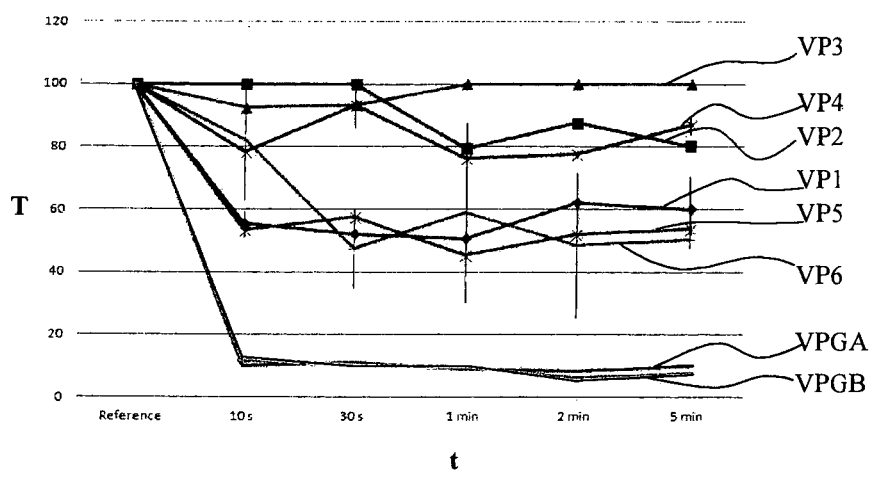

In FIGS. 8 and 9 the significantly increased clarification effect and the functional principle of the combined use of pectin/gallotannin is illustrated by means of a poorly clearing beer matrix using the previously described pectin rapid test.

FIG. 8 shows a pectin suitability test H90 distribution of the small particles <1 μm and the line VP of the haze T in EBC (H90) over time t for different pectins in a poorly clearing drinks matrix in direct comparison with lines VPGA and VPGB for two combined pectin/gallotannin uses.

FIG. 9 shows an H25 distribution of the coarser particles >1 μm and the respective line VP of the haze T in EBC (H25) over time t for different pectins 1 to 6 in a poorly clearing drinks matrix in direct comparison with the lines VPGA and VPGB for two combined pectin/gallotannin uses.

With the combined use of pectin/gallotannin it must be ensured that the gallotannins are added before the pectins so that the larger and better embedding particles of gallotannin-protein compounds are formed before the formation of the pectin network. This means that the gallotannins or gallotannin solutions have to be added during the production of drinks or in the brewing process before or shortly before the pectins or pectin solution.

Additional series of tests have shown that a time-delayed addition of pectin of >/=1 minute after the addition of gallotannin is sufficient to increase the clarification effect significantly.

Simultaneous use is only possible if the formation of the pectin network in the drinks matrix is delayed by technological means and a suitable choice of pectin (optimum degree of esterification or amidation).

With the combined use of pectin/gallotannin the required amount of gallotannin depends on the respectively used gallotannin product and can also be determined by a corresponding rapid test.

The addition of pectin in all of the described new applications is preferably between 1-200 ppm, more preferably 20-100 ppm, even more preferably 30-80 ppm (e.g. 2.5% (0.1-15%) dissolved in water or buffering solution, e.g. acetate buffer). Provided the process has been optimised the targeted use of specific pectins as clarifying agents in the drinks industry or brewing industry seems in any case to be an inexpensive alternative to the products already established on the market.

The invention claimed is:

1. A method for the clarification of a fermented beverage liquid including beer, wine, juices and comparable drinks which comprises the following steps:
    subjecting the beverage liquid to fermentation,
    subjecting the fermented beverage liquid to a clarification treatment to remove haze-forming components from the fermented beverage liquid by first treating the fermented beverage liquid with gallotannins, followed by treating the fermented beverage liquid with at least one pectin-containing clarifying agent, said fermented beverage liquid being treated with gallotannins at least one minute prior to treating the beverage liquid with the pectins-containing clarification treatment agent, said treatments increasing a filtration effect, and transferring the fermented beverage liquid to a maturation vessel where it is stored for a maturation period, wherein the gallotannins and pectin-containing clarification treatment agents introduced into the fermented beverage liquid between fermentation and maturation are substantially removed from the beverage liquid prior to maturation.

2. The method according to claim 1, wherein between the steps of treating the beverage liquid with the gallotannins and pectin-containing clarification treatment agents and transferring the beverage liquid to the maturation vessel, a preliminary clarification of the fermented beverage liquid is performed by removing pectin flakes from the fermented beverage.

3. The method according to claim 2, wherein between the step of treating the fermented beverage liquid with the clarification treatment agents and the fermented preliminary clarification, there is a period of contact between the pectin-containing gallotannins clarification treatment agents and the beverage liquid which is less than 24 hours.

4. The method according to claim 1, wherein, in a further method step, following the storage of the beverage liquid in the maturation vessel, the beverage liquid is filtered.

5. The method according to claim 4, wherein, during filtration, the fermented beverage liquid is removed from an upper third of the filled maturation vessel volume and is supplied to a membrane/diatomaceous earth filter.

6. The method according to claim 1, wherein the pectin and gallotannins containing clarification treatment agents contain pectin in the amount of 1 to 200 ppm relative to the amount of fermented beverage liquid to be treated.

7. The method according to claim 1, wherein the pectin and gallotannins containing clarification treatment agents are formed as an aqueous solution.

8. The method according to claim 1, wherein the pectin and gallotannins containing clarification treatment agents contain a pectin selected from the group Pectino-floc/A, B, C.

9. The method according to claim 1, wherein prior to treating the fermented beverage liquid with the pectin-containing clarifying agent, a determination is made to select a pectin, from a plurality of pectins, that is most suitable for treating the particular fermented beverage liquid.

10. The method according to claim 9, wherein in selecting the pectin from the plurality of pectins under consideration, each pectin is added in a predefined amount to the fermented beverage liquid and is centrifuged, followed by a haze measurement of the beverage liquid.

11. The method according to claim 1, wherein between the steps of treating the fermented beverage liquid with the clarification treatment agents and the preliminary clarification, there is a period of contact between the pectin and gallotannins clarification agents and the fermented beverage liquid which is less than 24 hours.

12. The method according to claim 2, wherein, in a further method step following the storage of the beverage liquid in the maturation vessel, the beverage liquid is filtered.

13. The method according to claim 3, wherein, in a further method step following the storage of the fermented beverage liquid in the maturation vessel, the beverage liquid is filtered.

14. The method according to claim 2, wherein the pectin and gallotannins containing clarification treatment agents contain pectin in an amount of 1 to 200 ppm relative to the amount of fermented beverage liquid to be treated.

15. The method of claim 1, wherein haze clarification of the fermented beverage liquid is efficiently achieved by removing of both small particles of less than 1 µm and large particles of greater than 1 µm.

16. The method of claim 1, wherein, by treating the fermented beverage liquid with the pectin and gallotannins containing clarification treatment agents, the colloidal and oxidation stability of the beverage liquid is improved and the gushing potential is reduced by the binding of the gallotannins to haze active or active gushing protein compounds whereby haze particles are embedded into the network formed by the pectin.

17. The method of claim 1, wherein the time delay addition of pectin is at least 1 minute after the addition of the gallotannins for effectively improving the clarification treatment.

18. The method of claim 1 wherein, the combined use of pectin and gallotannins is effective in reducing haze caused by both small particles of less than 1 µm and coarse particles of greater than 1 µm.

\* \* \* \* \*